N. J. FLINT.
PNEUMATIC VEHICLE TIRE.
APPLICATION FILED DEC. 30, 1913.
1,128,304.
Patented Feb. 16, 1915.
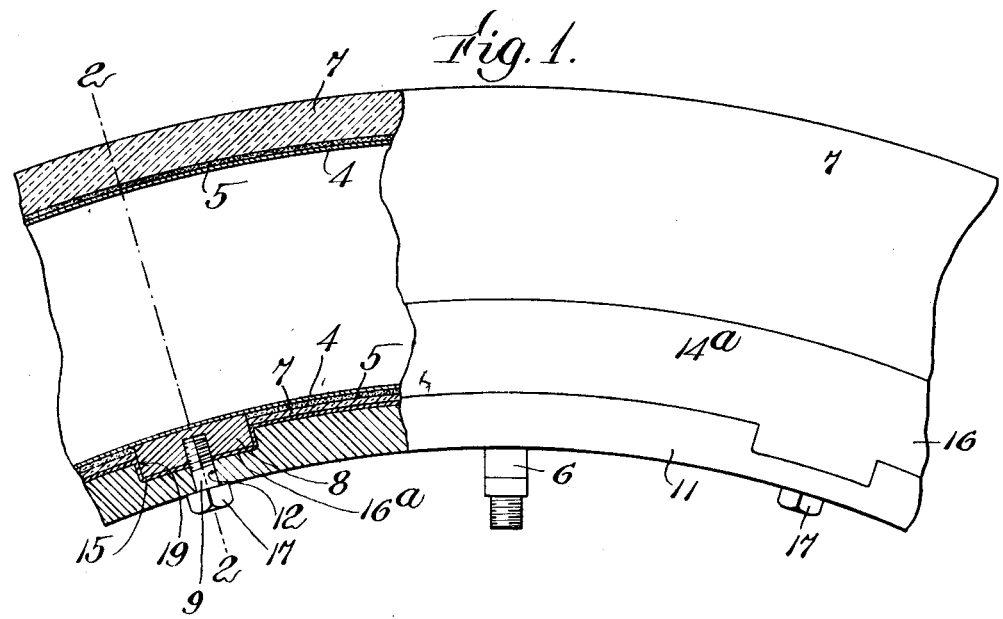
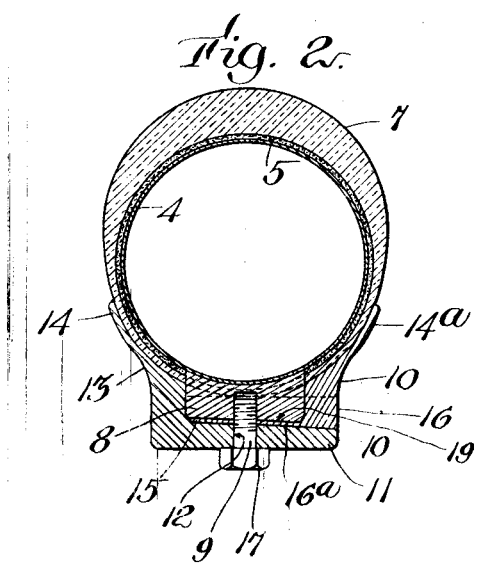
Witnesses:
a. Barr Comstock
Joseph H. Knight
Inventor:
Newton J. Flint,
by Everett N. Curtis
Attorney.

UNITED STATES PATENT OFFICE.

NEWTON J. FLINT, OF SUFFOLK, MASSACHUSETTS, ASSIGNOR OF ONE-HALF TO HENRY B. McQUEEN, OF BOSTON, MASSACHUSETTS.

PNEUMATIC VEHICLE-TIRE.

1,128,304.                Specification of Letters Patent.         Patented Feb. 16, 1915.

Application filed December 30, 1913. Serial No. 809,480.

*To all whom it may concern:*

Be it known that I, NEWTON J. FLINT, a citizen of the United States, residing at Boston, in the county of Suffolk and State of Massachusetts, have invented new and useful Improvements in Pneumatic Vehicle-Tires, of which the following is a specification.

My invention relates to pneumatic vehicle tires; and its objects are to prevent punctures, to lengthen the life of the tire, to provide a better means for distending the shoe, to render the tire readily detachable and at the same time secure, and to simplify and render more effective the operation of the several parts.

My invention primarily consists of an end-less metallic tube of drawn steel, the walls thereof being of sufficient thickness to afford some degree of resiliency and means being provided for inflating the said tube with air; the said tube being covered with layers of canvas and rubber for the purpose of affording a wearing surface for the tire and being provided with detachable means for affixing the same to the rim of the vehicle wheel.

My invention further consists in the various modifications and improvements hereinafter specifically described and claimed.

Attention is hereby directed to the drawing in which similar numerals of designation refer to similar parts throughout the several views.

Figure 1 is a side elevation, partly in section, of my invention. Fig. 2 is a cross-section on line 2—2 of Fig. 1.

Referring to the drawing, the tube 4 is an endless cylinder with thin walls composed of drawn steel or other suitable material, the walls being preferably constructed of a thickness barely sufficient to prevent the said tube from collapsing under the condition of ordinary use while at the same time affording considerable resiliency. The surface of the said tube I prefer to roughen by means of a sand-blast or other suitable apparatus in order that the canvas jacket 5 may be more readily cemented thereto and prevented from lateral displacement. In order to afford a cushioning means of reinforcement to the walls of said tube 4, I pump air therein through the air valve 6, in the well-known manner now employed for inflating automobile tires. The tube 4 has no other opening than valve 6.

The covering 5 may be formed by helical windings of strips of canvas, or in any other suitable manner. In order that the covering 5 may maintain its proper position, I prefer to have the same cemented to the tube 4 and to the outer jacket 7. The outer jacket 7 of my improved tire is preferably built up of strips of canvas and raw rubber upon the covering 5. In Fig. 2 it will be noted, upon inspection, that the said jacket 7 is made of considerably greater thickness at the outer part thereof, in order that the same may serve as a wearing surface or tread for the tire. The said jacket after being so built up from canvas and rubber is vulcanized by any of the processes of vulcanization now in common use. If desired leather or other suitable material may be used in forming the jacket 7 in place of the preferred material. For the purpose of securing my improved tire to the wheel rim of the vehicle I provide the metallic inner tube 4 with bosses 8 brazed thereto at regular intervals, there being preferably 8 or more of such bosses. Each of the bosses is provided with a screw threaded opening for the reception of the threaded bolt 9. The rim 10 is formed of two members 11 and 16. The spokes of the wheel are secured to the member 11, said member being provided with recesses 19 open at one end, openings 12 being provided for the reception of the shank of the bolt 9. The outer edge 13 of the member 11 is extended in the form of a flange 14 to cover a portion of the tire. The base 16ª of the member 16 is a flat plate of no great thickness which overlaps the member 11 and is provided with boxes or recesses 15 open at their inner ends to receive the bosses 8. Said member is provided with a flange 14ª, and also with openings registering with the openings 12. Preferably the part of the member 11 forming the seat for the member 16 is slightly inclined toward the edge thereof in order that the members may be wedged together.

In securing my improved tire, I first assemble the various parts of my device as shown in Fig. 2, the bolts 9, however, being absent, the boxes or recesses 15 being slid over the bosses 8, and the recesses 19 being slid over said boxes. Then upon screwing the bolts 9 into position by means of the nut-shaped heads 17 thereon, the said tire and various parts of the rims are firmly secured together. It is to be noted that in assembling the members 11 and 16, the tire is first brought into engagement with the flange 14 of the member 11, and that the member 16 is then slid into position and secured. By reversing these steps, that is, by first unscrewing the bolts 9 the member 16 of the rim may be detached and the tire readily removed.

Pneumatic tires now in common use are, as is well recognized, extremely liable to puncture, and are defective because of this reason. With my tire construction, however, it should be observed that because of the circular shape of the metallic inner tube that nails, tacks, and other objects presenting sharp points will, under ordinary circumstances, be deflected and glide from the tube without penetrating the same, there being no injury ordinarily sustained therefrom except to the tread of the jacket 7. It will also be observed that after my inner tube has once been inflated it will be a long time before it will be necessary to inflate the same again, if at all. The walls of said tube being hermetically sealed, the necessity, therefore of inflating the tube at frequent intervals as is the case with ordinary automobile tires will be practically obviated. Even when my improved tire is exposed to such violence as to puncture the inner tube, the remainder of the wall thereof will nevertheless be of sufficient steadiness to support the tread to a sufficient degree to permit the vehicle to proceed for a considerable time at a low speed and not to be obliged to be towed by some other vehicle.

The extending of the rim to form the lips 14 and 14ᵃ will be found to be an efficient means to provide against rim cuts and blowouts, which usually occur near the inner part of the shoe. The said lips also serve to firmly hold the tire in operative position and to protect the tire from external violence at those parts where the wall of the tire is thinnest.

What I claim and desire to secure by Lettres Patent is:

1. The combination with a pneumatic tire provided with an inner tube having exterior bosses, of a wheel rim formed of sections, one of said sections having depressed portions to receive said bosses, the other section having recesses to receive said depressed portions, and securing devices passed through the sections of said rim and engaging said bosses.

2. The combination with a pneumatic tire provided with an inner tube having exterior bosses, of a thin rim section having depressions to receive said bosses, a thick rim section having its periphery provided with recesses to receive said depressions, and securing devices passed through the sections of said rim and engaging said bosses.

3. The combination with a pneumatic tire provided with an inner tube having exterior bosses each provided with a threaded opening, of a wheel rim formed of sections, one of said sections having depressed portions to receive said bosses, the other section having recesses to receive said depressed portions, said sections having openings registering with the threaded openings of the bosses, and threaded bolts passed through the openings of said sections and engaging the openings of said bosses.

4. The combination with a pneumatic tire provided with an inner tube having exterior bosses, of a wheel rim formed of sections, one of which is provided with depressed portions, openings at one side to receive said bosses, and a flange at the other side, the other section having recesses leading in from one side to receive said depressed portions and provided at the other side with a flange, and securing devices passed through the sections of said rim and engaging said bosses.

In testimony whereof I have hereunto set my hand in presence of two subscribing witnesses, this 29th day of December 1913.

NEWTON J. FLINT.

Witnesses:
 HERBERT MANN CHASE,
 A. BARR COMSTOCK.